United States Patent [19]

Finkl et al.

[11] Patent Number: 5,252,120
[45] Date of Patent: Oct. 12, 1993

[54] METHOD AND APPARATUS FOR DOUBLE VACUUM PRODUCTION OF STEEL

[75] Inventors: Charles W. Finkl, Evanston; Guy A. Brada, Chicago; Algirdas A. Underys, Arlington Heights, all of Ill.

[73] Assignee: A. Finkl & Sons Co., Chicago, Ill.

[21] Appl. No.: 966,862

[22] Filed: Oct. 26, 1992

[51] Int. Cl.$^5$ .............................................. C21C 7/00
[52] U.S. Cl. ...................................... 75/508; 266/207; 373/60
[58] Field of Search ................ 75/508; 266/207, 208; 373/60

[56] References Cited

U.S. PATENT DOCUMENTS 4,994,108  2/1991  Hamagami ........................ 75/508

Primary Examiner—Peter D. Rosenberg
Attorney, Agent, or Firm—Baker & McKenzie

[57] ABSTRACT

A method and apparatus for producing high quality steel having less than about 1 ppm H, 50 ppm N, 25 ppm O and 0.005 S which includes subjection to vacuum, gas purging, and alternating current heating arcs, followed by shrouded pouring into sealed ingot molds to form a VAR electrode which is subsequently remelted under a very low absolute vacuum and re-solidified.

25 Claims, 3 Drawing Sheets

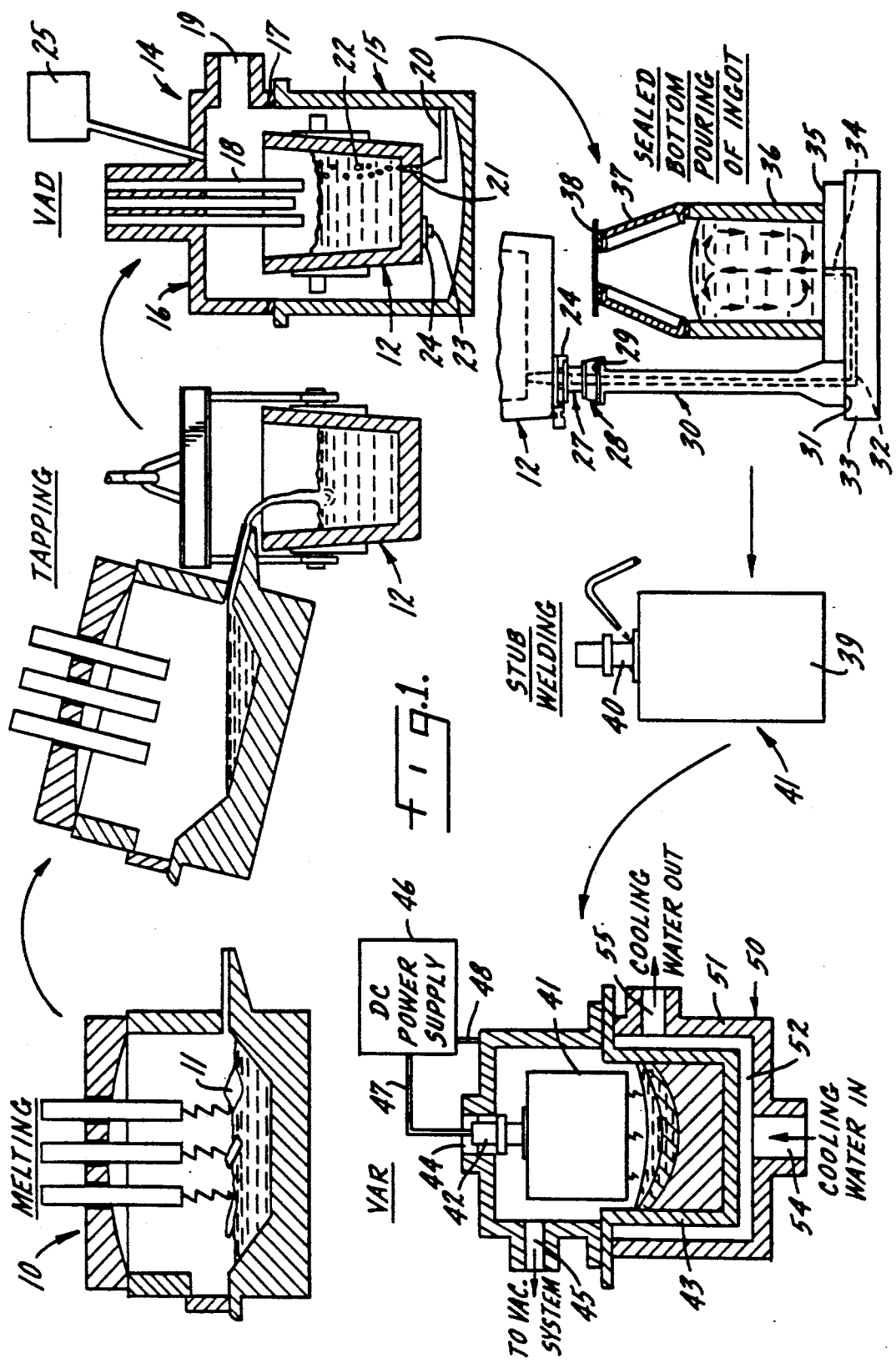

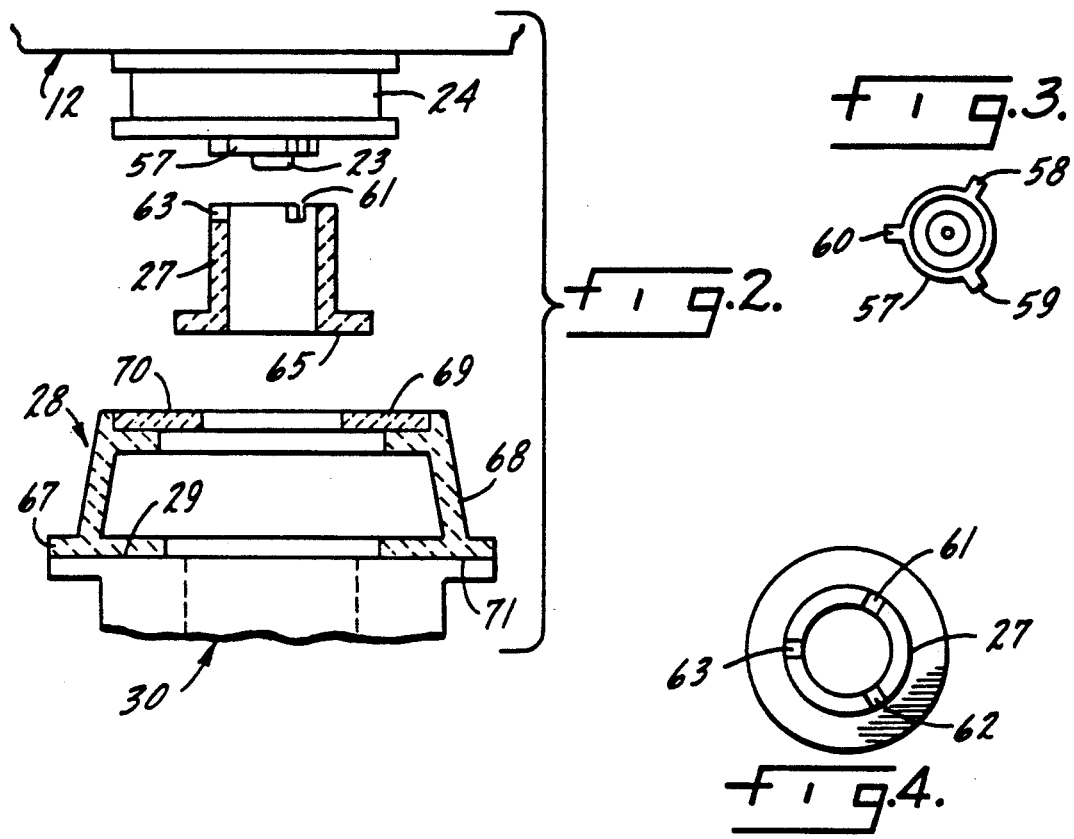

METHOD AND APPARATUS FOR DOUBLE VACUUM PRODUCTION OF STEEL

This invention relates to the production of steel of a quality better than either electroslag remelt or vacuum arc remelt quality in that gas values equal to or below those obtained by vacuum arc remelt procedures are obtained simultaneously with sulphur levels equal to or better than those obtained by VAR or ESR procedures. The invention relates specifically to methods and apparatus for the production of such steels which provides the lowest possible combined sulphur and gas values by the use of vacuum arc degassing and vacuum arc remelt.

BACKGROUND OF THE INVENTION

Vacuum arc remelting and electroslag refining are well known for the production of high quality steels. Though both processes are in widespread use today, neither process approaches an ultimate ideal in the sense of producing steel having an optimum combination of cleanliness and structure.

The ESR process, for example, decreases sulphur to very low levels but it cannot produce the exceedingly low H, O, and N levels which are demanded by certain high quality applications today, such as lens quality molding practices. The ESR slags are very sensitive to moisture which can, and often does, have a significant impact on H values. Indeed, variability sufficient to impact on final gas values can occur between slag batches and suppliers. Even weather can be a factor. When a heat is run in a hot, humid mid-summer day as contrasted to a cool, dry fall or winter day, the final H content may be, and often is, higher during the humid operating conditions. Very low sulphur values are characteristic of the ESR process but it is impossible to avoid some contamination in the form of inclusions since the process is one in which a liquid slag is in continuous contact with the liquid steel and thus there is always the possibility of undesired migration of inclusions from the slag to the metal at the slag-metal interface.

Certain other drawbacks which are a function of the inherent operation of the ESR process have also been noted. For example, the possibility of coarse dendritic structures being formed in the ESR process is always present, these structures being attributable to the rather sharp "V" shape of the molten pool which in turn adversely affects the solidification pattern with a consequent increase in the formation of dendritic structures.

The vacuum arc degassing process, as exemplified by U.S. Pat. No. 3,501,289, on the other hand can yield very low H, O, and N levels. Low sulphur levels can also be attained, but this must be achieved primarily by careful control of the desulphurizing additions prior to the vacuum electric arc and violent stirring phase. Nonetheless, qualities which approach aircraft quality specifications can be consistently attained using the vacuum arc degassing process. However, it has been determined that for some very critical applications, such as lens quality mold steel, the vacuum arc degassing process cannot alone provide the consistently proper structure which is available by vacuum arc remelting.

By lens quality mold steel is meant typical mold or stainless steel intended to take and maintain a high polish and which is used, for example, in such applications as extrusion dies or molds for clear glass or plastic parts. Examples of such parts are the clear plastic or glass shields covering the instrument panel in automobiles, the clear shield which forms part of aircraft fighter pilot headgear or TV tubes.

Stated generally, many mold steel applications require superior homogeneous steels which can maintain a high hardness level at operating temperatures while providing lens quality polishability free of defects that may impart flaws to the finished part. These steels must also be capable of resisting fatigue cracking, heat checking, thermocycling, impact loading failures, and must have isotropic properties. Today the material of choice is AISI H-13 steel which is a 0.4C-5Cr-1.5Mo-1V hot work tool steel which is used for extrusion, forging and die casting applications. This material however does not always produce the desired characteristics when produced by methods currently used in the trade.

Thus there exists a need for a means of producing high quality premium steels intended for demanding and/or critical applications such as extrusion, die casting, or forging dies.

SUMMARY OF THE INVENTION

The invention is a unique double vacuum process which achieves the optimum combination of cleanliness and structure in high quality steels of which H-13 Premium is an example.

The process consists preferably, but not necessarily, of a dephosphorized electric furnace melt followed by the vacuum arc degassing process for desulphurization and degassing. The steel is then bottom or top poured into shrouded or sealed ingot moulds. The solidified ingots are subsequently conditioned into electrodes for remelting. The electrodes are then processed in a vacuum arc remelting (VAR) furnace to refine the structure, improve cleanliness, reduce segregation and further reduce the gas contents. The steel is improved during each step of the processing sequence to thereby yield a high quality, premium product. Only by the double vacuum process can steels be produced with both extremely low sulphur and extremely low gas values.

An example of the application of the process is as follows:

A heat of steel is melted from select scrap which is chemically analyzed to minimize detrimental tramp elements such as lead, tin, and cobalt. Approximately sixty tons of scrap is charged into an electric arc furnace. The furnace uses three 14 inch diameter graphite electrodes powered by a 15 mega-Watt transformer to supply the heat required to melt the scrap. Early in the heat oxygen is injected into the melt which combines with carbon to form carbon monoxide. This reaction is called the "carbon boil" reaction and has two purposes: to generate heat in the bath and to flush out detrimental inclusions. This period of the melting cycle is called the oxidation period. During the oxidation cycle, phosphorus is removed from the steel into the slag as $P_2O_5$. This is important since phosphorus can cause embrittlement in steels. After the oxidation step the slag containing the phosphorus is removed from the furnace.

The second slag, the reducing slag, is now developed which may consist of lime, alumina, and fluorspar. This slag is used to reduce the oxygen and sulphur content. Finally, alloy additions are added to bring the steel close to the final target chemistry. The steel is tapped into a ladle which is then moved to the vacuum arc degassing station.

At the vacuum arc degassing station the ladle of steel is sealed in a chamber which is pumped down to a pressure of as low as about 0.5 mm Hg absolute (1/1500th of atmospheric pressure). Argon is purged through the bottom of the ladle to stir the steel which exposes the molten metal to the vacuum. During this process sulphur is removed from the steel down to very low levels; i.e.: <0.003%. Also in the vacuum arc degassing process, hydrogen, nitrogen, and oxygen collect the argon bubbles and are removed to levels of less than about 2 ppm, 80 ppm, and 30 ppm respectively. An alloy hopper is used to fine tune alloying elements to achieve the desired final chemistry. Calcium, silicon, aluminum and/or carbon wire or solids may also be added to fine tune the chemistry, and to adjust the Ca/Al balance, thus achieving the optimum inclusion morphology and size distribution.

Finally, the three 14 inch vacuum arc degassing electrodes, powered by a 7.5 mega-Watt transformer, are used to heat the steel to the optimum teeming temperature (±6° C.) to ensure proper ingot solidification.

The steel is then bottom or top poured into ingot moulds which may be shrouded or sealed to provide a protective atmosphere.

The combination of a clean melting and refining practice and vacuum arc degassing treatment produces extremely clean ingots which approach electroslag remelt quality. This quality level is further enhanced by the second vacuum melting process which is carried out in the VAR unit, next to be described. It should be noted that only by using a vacuum arc degassing remelt cycle can sulphur be minimized while achieving low levels of hydrogen, nitrogen, and oxygen.

After solidification, following vacuum arc degassing, the ingots are removed from the moulds and are prepared for remelting. The vacuum arc degassed electrode is conditioned to remove all of the electrode scale. A steel stub is welded to the electrode which serves as the power connection and electrode hanger (or support) for the vacuum arc remelt process. The electrode is now ready to be remelted.

The VAR electrode is attached to the power source and is then sealed in the vacuum chamber of the VAR furnace. The system is then evacuated to an operating pressure of less than about 100 microns Hg, and preferably about 10-20 microns Hg (1/40,000th of atmospheric pressure). This very low pressure is maintained during furnace operation using a two stage vacuum system consisting of a mechanical pump and a Roots-type blower. This vacuum system removes large quantities of off-gas and maintains low pressure throughout the remelt cycle.

An arc is struck between the bottom of the electrode and the bottom of the water-cooled, copper crucible to begin the melting process. The power supply is designed to provide a stable arc regardless of extreme variations in load levels, from open-circuit to short-circuit conditions A closed-loop computer control system is used to constantly monitor and control the process using feedback from several process control variables to maintain the process within a specified operating range As the electrode is melted the liquid drips through the deep vacuum arc region and is resolidified into a VAR ingot below. The molten steel droplets have very large surface areas which are exposed to the high vacuum, thereby facilitating maximum removal of gases. This mechanism results in very low gas levels. Final gas contents are typically less than 1 ppm hydrogen, less than 25 ppm oxygen, and less than 50 ppm nitrogen.

A stable controlled molten pool is maintained between the melting electrode and the resolidifying VAR ingot. The depth of this molten pool is carefully controlled to maintain a consistent "U" shaped pool profile which minimizes dendrite size and segregation in the final product. The result is an ingot which has homogeneous properties and will respond uniformly during subsequent heat treatments.

Water is circulated around the outside of the copper crucible to remove heat from the system and promote controlled solidification. In the VAR, heat input is supplied by the arc and is controlled by varying the voltage and current. Thus, by controlling the rate of heat removal and the rate of heat input, it is possible to control solidification to maintain a desired solidification rate. The result of the rapid controlled solidification rate is a decrease in the as-solidified grain size which improves the properties of the steel.

By remelting an ingot under vacuum it is possible to substantially improve those steel properties which are sensitive to metallurgical structure, the presence of deleterious gases, and nonmetallic inclusions. Such properties as fatigue resistance, impact toughness, ductility, and wear resistance can be substantially improved while reducing alloy segregation and anisotropy. The vacuum arc remelting process has the capability of producing high quality steels through a combination of controlled solidification and vacuum refining when supplied with the proper vacuum arc degassed electrode.

Thus the vacuum arc degassing process combined with the vacuum arc remelting process produces the highest quality electric-furnace melted steel available today.

BRIEF DESCRIPTION OF THE FIGURES

The invention is illustrated more or less diagrammatically in the accompanying drawing wherein:

FIG. 1 is a flow diagram showing the basic processing steps;

FIG. 2 is an exploded view of the sealed connection between the pouring nozzle of the ladle and the top of the pouring trumpet;

FIG. 3 is a bottom plan view of the nozzle holder of the slide gate;

FIG. 4 is a top plan view of the nozzle sleeve;

FIG. 5 is a top plan view of the linear shroud;

DESCRIPTION OF THE INVENTION

Figure 7:
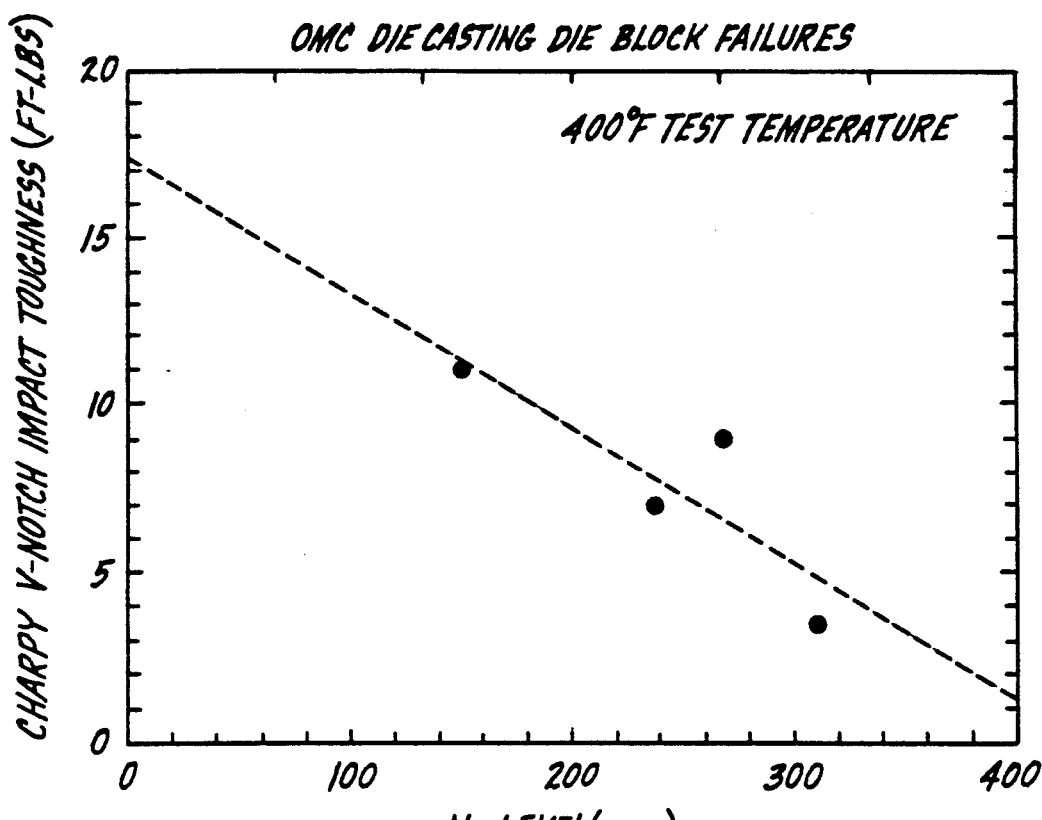
FIG. 7 is a graph showing the increase in impact properties with a decrease in N content to the levels attainable with this invention.

Like reference numerals will be used to indicate like parts and features from Figure to Figure of the drawing.

Referring first to FIG. 1, a conventional electric arc furnace is indicated generally at 10. As is well known, arc furnace 10 melts selected scrap, a few partially solid pieces of which are indicated at 11. Slag materials, such as lime, along with make-up quantities of alloys, and oxygen are added to the furnace. Preferably a two-slag treatment is used. The first slag is an oxidizing slag, one purpose of which is to decrease the phosphorous level. The bulk of the inclusions inherent in the furnace process is flushed out in this step. The first slag is then removed and a second or reducing slag is added to the melt. The reducing slag decreases the oxygen level thereby allowing sulphur removal. Further alloy additions are made following one or more tests to bring the composition of the melt close to the final desired chemistry.

Following furnace treatment the molten steel, or the molten steel with only a small quantity of slag, is tapped into a VAD process ladle indicated at 12. Ladle 12 is then transported to the vacuum arc degassing station and lowered into the VAD processing tank or chamber indicated generally at 14. The VAD station is essentially a tank which may rest on the floor or be partially sunk into the floor. The tank includes a lower half, indicated generally at 15, and an upper half, indicated generally at 16. When the tank 14 is closed a seal 17 is formed between the two halves. Sealed electrodes are indicated at 18 and a connection to a vacuum system is indicated at 19. If, for example, a tank of approximately 1900 cubic feet is used to process a ladle containing on the order of about 65-70 tons of molten charge, a four-stage steam jet ejector system may be used which has the capacity to evacuate the closed chamber to pressures on the order of about 0.5 mm Hg absolute in about fifteen minutes. The electrodes may be graphite and of approximately 14 inches in diameter and suitably powered by an approximate 7.5 mega-Watt transformer.

A source of purging gas, such as argon or nitrogen, is indicated at 20, the gas being discharged through a porous plug 21 in the bottom of the ladle to emit a fine stream of gas which expands up to approximately 1400 times in volume as the individual gas bubbles 22 travel upwardly in the melt, thereby stirring the melt whereby portions of the melt remote from the surface are brought to the surface, to equalize the temperature, to homogenize the melt whereby the chemical composition is made uniform throughout, and to form, within the individual bubbles of gas, low pressure zones into which the included gases, such as H, O, and N, can migrate to as the bubbles travel upward and hereafter leave the system. The purging action also flushes out smaller inclusions than can be removed in air melting. A teeming nozzle 23 under control of a slide gate 24 is closed during this stage. An alloy hopper is indicated at 25, the hopper being used to fine tune selected alloy elements to achieve the final desired chemistry.

Calcium, silicon, aluminum and/or carbon wire or solids may be added to achieve the optimum inclusion morphology and size distribution. Sulphur can also be removed to the level such that a heat can be consistently tapped from the furnace at less than 0.010%, and can be decreased to less than 0.003% following vacuum arc degassing, in this two step process.

During vacuum arc degassing treatment the H may be lowered into the flake-free range of about 2.2 ppm, and, on occasion, to 1 ppm or even less. The O may be lowered into a range of about 25 or less ppm, and the N may be lowered into the range of 80 ppm or less.

In the vacuum arc degassing process the melt is brought to the desired teeming temperature by regulation of the system variables including power input from electrodes 18, gas purge rate, and dwell time. As is now well known, the temperature of the melt can be consistently brought into the range of $\pm 10°$ F. of the desired teeming temperature using the VAD system.

Following vacuum arc degassing treatment the ladle 12 is moved to the bottom teeming or bottom pouring station At the bottom pouring station a nozzle sleeve, indicated generally at 27, is secured to the slide gate 24 and thereafter the nozzle sleeve is brought into tight abutting engagement with a liner shroud, indicated generally at 28, located on the upper end 29, see FIG. 2, of a pouring trumpet indicated generally at 30. The bottom 31 of the pouring trumpet connects with a passage 32 in trumpet base 33, the passage communicating with a bottom port 34 in mould stool 35. Ingot mould 36 rests on mould stool 35 and a hot top is indicated at 37 and a mould seal plate at 38.

The sealing system which precludes contact of ambient atmosphere with the pouring stream during pouring from the vacuum arc degassing is illustrated best in FIGS. 2-5.

Referring first to FIG. 2, it will be seen that a nozzle holder 57, which fits over the teeming nozzle 23, projects downwardly beneath slide gate 24. The nozzle holder includes, in this instance, three equidistantly spaced ears 58, 59 and 60, see FIG. 3. The nozzle sleeve 27 includes three notches 61, 62 and 63 which mate tightly with ears 58, 59 and 60 respectively of the nozzle holder 57. The nozzle sleeve is formed from a somewhat spongy and slightly resilient ceramic material. The bottom 65 of the nozzle sleeve 27 is finished with as flat a surface as is feasible given the limitations of available forming equipment and cost.

The linear shroud, indicated generally at 28, includes, in this instance, a base section 67 from which wall 68 projects upwardly. The base and wall may be integrally formed. The top or splash pad 69 may also be integrally formed with the wall or, as illustrated, it may be a separate piece which is glued into a mating socket in the upper end portion of wall 68. The base section 67 is of a sufficient size to make abutting contact with upper end 29 of the pouring trumpet 30, and may be of any convenient shape such as the square contour illustrated in FIG. 5. The shroud is preferably made from the same material as the nozzle sleeve and the top surface 70 and bottom surface 71 are finished with parallel surfaces which are as flat as feasible within the limitations of available forming equipment and cost so that a flat, tight seal is formed between the bottom 65 of the nozzle 27 and the top 70 of the shroud, and between the bottom 71 of the shroud and the top 29 of the trumpet 30. If desired, the shroud may have an aperture for connection to a source of inert gas such as argon, but excellent results have been obtained without using a synthetic gas environment and relying, instead, on the CO which is evolved during pouring.

It will be understood that the molten metal path between the ladle 12 and ingot mould 37 is a closed passageway since a seal is formed between the nozzle sleeve 27 and the slide gate 24, between the nozzle sleeve and the linear shroud 28, between the linear shroud and the pouring trumpet 30, between the pouring trumpet and trumpet base 33, and between mould stool 35 and ingot mould 36. The interior of the ingot mould 36 is a sealed chamber since there is a tight fit between the mould wall and the mould stool 35, between the mould and the hot top 37, and between the hot top and mould seal plate 38. The several seals are not as tight as the seals in the vacuum arc degassing unit but they are sufficiently tight fitting so that no ambient atmosphere can penetrate the system if there is a slight positive pressure in the system. In operation, a slight pressure is created in the system by the evolution of CO as the metal flows into the pouring trumpet from ladle 12. The evolution will continue for substantially as long as the metal remains liquid. Since CO forms a neutral atmosphere above the surface of the molten steel as it rises in the ingot mould, the molten metal is subjected to a protective neutral atmosphere at all, or substantially all, periods it is in a molten condition following pouring. Similar techniques may be used for top pouring.

After suitable processing, to be described hereinafter, a stub 40 is welded to one end of the poured vacuum arc degassing ingot 39 to complete the conversion of the vacuum arc degassing ingot into a VAR electrode.

The VAR electrode, indicated generally at 41, is then attached to the ram 42 of the VAR and inserted into the copper crucible 43 of the VAR.

The VAR includes crucible 43 which has a port 44 which receives ram 41 in vacuum tight relationship, and a vacuum off-take 45 which may for example be connected to an evacuation system which includes a mechanical vacuum pump and a Roots-type blower, the vacuum system having the capacity to evacuate the system to an operating pressure on the order of about 10-20 microns Hg. Power is applied to electrode 41 by a DC power supply 46 connected to the stub 40 by conduit 47 and to the crucible by conduit 48.

A cooling jacket is indicated generally at 50, the jacket including an outer shell 51 which, together with the exterior of the crucible, forms a cooling chamber 52 surrounding that portion of the crucible which makes contact with molten steel. A cooling water inlet 54 and outlet 55 and suitable flow regulators, not shown, function to control the removal of heat and to thereby control the rate of solidification of the final VAR ingot.

Figure 6:
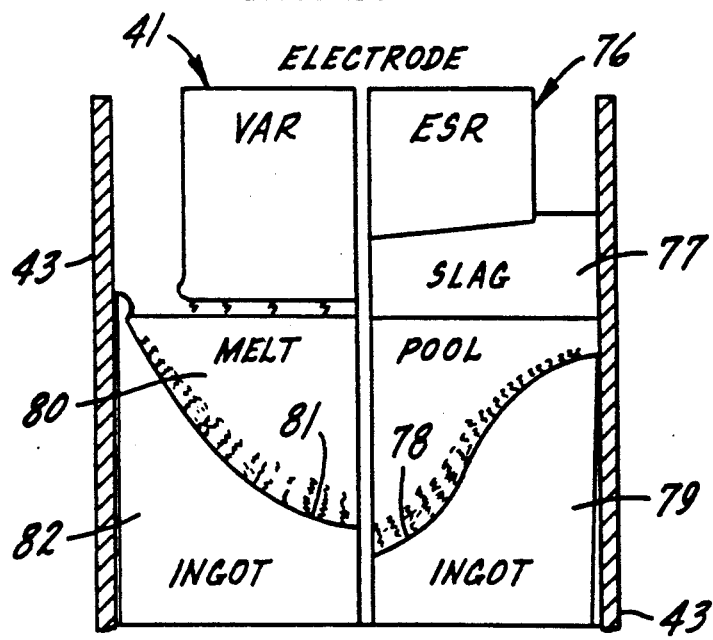
FIG. 6 is a schematic diagram of liquid pool profiles for the VAR and ESR processes.

One of the significant advantages of vacuum arc remelting over electroslag remelting is illustrated in FIG. 6 which is a schematic comparison between the two processes. In the ESR process the ESR electrode 76 is submerged in a molten slag 77. The slag completely covers the surface of the melt pool for the purpose of protecting the surface of the remelted metal from reoxidation prior to solidification. It will also be seen that a V-shaped pool 78 of remelted steel is formed between the slag 77 and above the solidified ESR ingot 79.

By contrast, the bottom of the VAR electrode 41 does not contact the top of the VAR melt pool 80. As a consequence each drop of the remelted vacuum arc degassing electrode is exposed to the very low absolute pressure in the system and hence maximum opportunity is provided for the migration of gasses within each drop to the surface thereof, and subsequent removal from the system. It will also be seen that U-shaped pool 81 of remelted steel is formed at the top of the VAR ingot 82.

A comparison of the internal structure of the ESR and VAR ingots has disclosed substantially fewer dendritic formations in the VAR ingot.

The importance of low gas value, in this instance N, in connection with die casting die life can be seen from FIG. 7. From this Figure it will be noted that an increase in N results in a decrease in impact values An N content of about 120 ppm approximately triples the impact properties over a steel having approximately 300 ppm N. The combined vacuum arc degassing and vacuum arc remelting process of this invention has produced a final product having less than 50 ppm N whereas it is believed that contents of less than about 120 ppm N are seldom attained by the ESR process.

Final gas values which are achieved by the above-described process will be, in the same heat, less than 1 ppm H, less than 80 ppm N and usually less than 50 ppm N and less than 25 ppm O. This has been attained in conjunction with a fine grain size and near isotropic steel. Further, the final product will have less than about 0.003 S and have a combined S and N content of less than 100 ppm.

One of the most significant differences between the above described process and the conventional ESR process which many steelmakers employ in an effort to make lens quality steel resides in the method of shielding the molten steel from the air. In the process of this invention a vacuum is maintained over the liquid steel at all times, including during the final melting and solidification phase, and thus oxidation cannot occur and gases are continuously removed from the steel. In the ESR process, by comparison, the slag generally consists of fluorospar, alumina and lime which is located directly on top of the molten steel. Though this slag represents an attempt to shield the steel from atmosphere, gases are not removed to the low levels which characterize the present invention.

Further, with ESR, there is the possibility of entraining some of the slag into the steel during the process. This is impossible in the present invention since no slag materials are ever present during the final melting-/solidification VAR phase. Should, despite all precautions, inclusions be present in the final meeting/solidification phase, the shallow pool (as contrasted to the pool formed in the ESR process) provides maximum opportunity for them to float to the top before resolidification takes place.

Although a preferred embodiment of the invention has been illustrated and described, it will be apparent that modifications may be made within the spirit and scope of the invention. Accordingly, it is intended that the scope of the invention not be limited by the foregoing exemplary description, but solely by the scope of the hereafter appended claims when interpreted in light of the relevant prior art.

We claim,

1. In a method of producing high quality steel having low gas, sulphur and inclusion contents, the method comprising the steps of
    subjecting a heat of steel in a container to the simultaneous application of a vacuum and a purging fluid which proceeds from a lower portion of the heat to an upper portion of the heat whereby portions of the heat remote from the surface are brought to the surface where they are exposed to the vacuum,
    subjecting the heat to an electric heating arc under vacuum,
    solidifying the heat to form an electrode, and
    remelting the electrode in a low absolute pressure environment to form an ingot in a cuprous crucible, said ingot having low O,H,N contents and a very low sulphur content.

2. The method of claim 1 further comprising the ingot has less than about 0.005 sulphur.

3. The method of claim 1 further comprising the heat is subjected to the electric heating arc during at least a portion of the time the heat is subjected to the simultaneous action of the vacuum and the purging fluid.

4. The method of claim 3 further comprising the purging fluid is an inert gas.

5. The method of claim 1 further comprising following subjection of the heat to the simultaneous application of the vacuum and the purging fluid, the heat is poured under a protective atmosphere from the container into a mold prior to the initial solidification.

6. The method of claim 5 further comprising the pouring stream between the container and the mold is sealed from ambient atmosphere, and the interior of the ingot mold in which the electrode is formed is also sealed from ambient atmosphere.

7. The method of claim 6 further comprising the protective atmosphere surrounding the pouring stream between the container and the mold, and the protective atmosphere in the interior of the mold are generated at least in part by the evolution of CO from the poured metal and oxidizing the oxygen in the mold with the carbon in the steel to from CO.

8. The method of claim 1 further including the step of removing all scale from the exterior surface of the electrode following initial solidification and prior to remelting.

9. The method of claim 1 further comprising
the heat is initially melted from scrap in an electric furnace and further including the step of
subjecting the heat to a reducing slag in the electric furnace to decrease the sulphur content.

10. The method of claim 9 further comprising the electric arc furnace melted heat, following furnace slag treatment, is tapped into a treatment ladle prior to subjection of the heat to the simultaneous vacuum and purging fluid.

11. In a method of producing high quality steel having final gas contents on the order of about less than 1 ppm H, less than about 0.80 ppm N, less than about 25 ppm O and less than about 0.003 sulphur, method comprising the steps of
making up a heat of steel in an electric arc furnace,
tapping the heat into a treatment receptacle,
subjecting the heat to the simultaneous action of a vacuum on the order of about 1 mm. Hg or below and a purging gas which is bubbled upwardly through the lower portion of the receptacle until the sulphur is reduced to a low level,
bottom pouring the low gas, low sulphur molten steel into an ingot mold under an inert atmosphere,
solidifying the steel to form an ingot,
converting the ingot into a remeltable electrode, said conversion including the step of removing scale from the ingot following solidification,
remelting the electrode in a copper crucible under an operating pressure of less than about 100 microns Hg, and
solidifying the remelted electrode to form an ingot having less than about 1 ppm H, less than about 80 ppm N, less than about 25 ppm N and less than about 0.003 sulphur.

12. The method of claim 11 in which the inert atmosphere is derived primarily, at least, from the evolution of CO and other non-deleterious gases from the molten metal prior to initial solidification.

13. The method of claim 12 further comprising a stable pool of remelted metal having a U-shaped pool profile is provided in the remelting of the electrode.

14. The method of claim 13 further comprising a melt rate is maintained during the melting of the electrode whereby a controlled solidification rate is achieved.

15. A system for producing high quality steel, said system including
means for preparing a melt of low phosphorous, low sulphur steel,
means for further processing the melt gas levels on the order of about 2 ppm H, 80 ppm N, 30 ppm O and 0.03, or below, S,
means for pouring the processed melt a protective atmosphere into an ingot mold,
means for converting the ingot which solidifies in the ingot mold to a remeltable electrode, and
means for remelting the electrode under a low absolute pressure to produce a steel having less than about 1 ppm H, less than about 50 ppm N, less than about 25 ppm O, and less than about 0.005 S, characterized by a fine grain and by a substantially inclusion and dendritic-free microstructure.

16. The system of claim 15 further comprising
the means for preparing the melt is an electric arc furnace,
secondly, in that the means for further processing the melt is a container for the melt, structure for forming a vacuum above the surface of the melt in the container, purging gas admission means for admitting purging gas to the lower portion of the melt, and an alternating current heating arc for adding heat to the melt while the melt is subjected to vacuum and the purging gas,
thirdly, in that the pouring means includes a pouring system having a closed interior so as to be sealed against ambient atmosphere, and
fourthly, in that the remelting means includes a cooled cuprous crucible having structure for remelting the electrode under a vacuum on the order of about 10 to 20 microns Hg.

17. The system of claim 16 further comprising
the pouring system further includes, firstly, a ceramic shroud which makes sealing contact between the pouring structure on the bottom portion of the container and the upper end portion of trumpet located between the container and the ingot mold and, secondly, a seal plate on the upper portion of the ingot mold which seals the interior of the ingot mold from ambient atmosphere.

18. The system of claim 17 further including,
a ceramic sleeve whose upper end portion is disposed in sealing contact with the bottom of the container about the pouring nozzle of the container, and whose lower end portion makes sealing contact with the deformable ceramic shroud.

19. The system of claim 18 further comprising the ceramic sleeve is deformable.

20. A method of producing lens quality steel having a minimum of deleterious inclusions, a near isotropic microstructure and not over 0.005 S, 1 ppm H, 30 ppm O, and 50 ppm N which includes the steps of
subjecting a heat of molten steel in the simultaneous action of a vacuum, purging gas and electric heating arc to form a VAR electrode, and
thereafter vacuum arc remelting the electrode to form a product having not over 0.005 S, 1 ppm H, 30 ppm O and 50 ppm N.

21. The method of claim 20 further comprising, upon extended processing, the final product has <0.003 S, <1 ppm H, <10 ppm O and <50 ppm N.

22. The method of claim 21 further comprising the final product has a combined sulphur and nitrogen level of less than 100 ppm.

23. Steel made according to the method of claim 20.
24. Steel made according to the method of claim 21.
25. Steel made according to the method of claim 22.

* * * * *